United States Patent
Cron et al.

(10) Patent No.: US 11,505,003 B2
(45) Date of Patent: Nov. 22, 2022

(54) NON-PNEUMATIC TIRE

(71) Applicants: Compagnie Generale des Etablissements Michelin, Clermont-Ferrand (FR); Steven M Cron, Simpsonville, SC (US); Brian Narowski, Greer, SC (US); Timothy Brett Rhyne, Greenville, SC (US)

(72) Inventors: Steven M Cron, Simpsonville, SC (US); Brian Narowski, Greer, SC (US); Timothy Brett Rhyne, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 84 days.

(21) Appl. No.: 16/646,322

(22) PCT Filed: Sep. 11, 2018

(86) PCT No.: PCT/US2018/050512
§ 371 (c)(1),
(2) Date: Mar. 11, 2020

(87) PCT Pub. No.: WO2019/051502
PCT Pub. Date: Mar. 14, 2019

(65) Prior Publication Data
US 2020/0282772 A1    Sep. 10, 2020

Related U.S. Application Data

(63) Continuation of application No. PCT/US2017/051028, filed on Sep. 11, 2017.

(51) Int. Cl.
*B60C 7/22* (2006.01)
*B60C 7/18* (2006.01)
(Continued)

(52) U.S. Cl.
CPC .......... *B60C 7/22* (2013.01); *B60C 7/18* (2013.01); *B60B 9/04* (2013.01); *B60C 7/146* (2021.08); *B60C 11/00* (2013.01)

(58) Field of Classification Search
CPC .. B60C 7/22; B60C 7/18; B60C 7/146; B60C 2007/146; B60C 11/00; B60B 9/04
See application file for complete search history.

(56) References Cited

U.S. PATENT DOCUMENTS

2006/0249236 A1 * 11/2006 Moon ................. B60C 11/0306
                                                                152/246
2012/0067481 A1 *  3/2012 Cron ........................ B60C 7/18
                                                                152/326
(Continued)

FOREIGN PATENT DOCUMENTS

DE      1178315 B  *  9/1964  ............... B60C 7/22
EP      2141030 A1 *  1/2010  ........... B60C 17/041
(Continued)

OTHER PUBLICATIONS

International Search Report and Written Opinion dated Apr. 12, 2018.

*Primary Examiner* — Kip T Kotter
(74) *Attorney, Agent, or Firm* — John Steckler Schwab

(57) ABSTRACT

A non-pneumatic tire (10) comprising a tread band having a ground engaging surface, a first reinforcement layer (250) comprised of at least one reinforcement (251) oriented in the tire's circumferential direction, a second reinforcement layer (254), located radially outward from said first reinforcement layer (250), said second reinforcement layer (254) comprised of a plurality of reinforcements oriented at an angle in a first direction to said tire's circumferential direction, a third reinforcement layer (258), located radially outward from said second reinforcement layer (254), said third reinforcement layer (258) comprised of a plurality of rein- (Continued)

forcements oriented at an angle in a second direction to said tire's circumferential direction and a fourth reinforcement layer (262), located radially outward from said third reinforcement layer (258), comprised of at least one reinforcement oriented in the tire's circumferential direction.

17 Claims, 6 Drawing Sheets

(51) Int. Cl.
*B60B 9/04* (2006.01)
*B60C 11/00* (2006.01)
*B60C 7/14* (2006.01)

(56) References Cited

U.S. PATENT DOCUMENTS

| | | |
|---|---|---|
| 2016/0257170 A1 | 9/2016 | Sugiya et al. |
| 2017/0072746 A1 | 3/2017 | Iwamura et al. |
| 2017/0080756 A1* | 3/2017 | Van Riper ............... B60C 7/08 |
| 2017/0197467 A1 | 7/2017 | Iwamura et al. |
| 2017/0305192 A1 | 10/2017 | Yokoyama et al. |

FOREIGN PATENT DOCUMENTS

| | | | | |
|---|---|---|---|---|
| GB | 2051699 A * | 1/1981 | ............... | B60C 7/22 |
| WO | WO-2013095499 A1 * | 6/2013 | ............... | B60C 7/22 |

\* cited by examiner

NON-PNEUMATIC TIRE

FIELD OF THE INVENTION

The subject matter of the present invention relates to a tread band for a non-pneumatic tire.

SUMMARY OF THE INVENTION

Aspects and advantages of the invention will be set forth in part in the following description, or may be obvious from the description, or may be learned through practice of the invention.

In at least one embodiment is described a non-pneumatic tire attached to a hub, the non-pneumatic tire including: a tread band; a plurality of connecting elements connecting the tread band to the hub; wherein the tread band further comprises: a ground engaging surface; a first reinforcement layer comprised of at least one reinforcement oriented in the tire's circumferential direction; a second reinforcement layer, located radially outward from the first reinforcement layer, the second reinforcement layer comprised of a plurality of reinforcements oriented at an angle in a first direction to the tire's circumferential direction; a third reinforcement layer, located radially outward from the second reinforcement layer, the third reinforcement layer comprised of a plurality of reinforcements oriented at an angle in a second direction to the tire's circumferential direction; a fourth reinforcement layer, located radially outward from the third reinforcement layer, comprised of a plurality of reinforcements oriented in the tire's circumferential direction.

The non-pneumatic tire may have at least one reinforcement of the first reinforcement layer oriented at an angle in a range of 0 to 5 degrees and the at least one reinforcement of the fourth reinforcement layer is oriented at an angle in a range of 0 to 5 degrees.

The non-pneumatic tire may have at least one reinforcement of the first reinforcement layer oriented at an angle in a range of 0 to 1 degrees and the at least one reinforcement of the fourth reinforcement layer oriented at an angle in a range of 0 to 1 degrees.

The non-pneumatic tire may have at least one reinforcement of the first reinforcement layer oriented at an angle in a range of 0 to 0.2 degrees and the at least one reinforcement of the fourth reinforcement layer oriented at an angle in a range of 0 to 0.2 degrees.

The non-pneumatic tire may have the plurality of reinforcements of the second reinforcement layer oriented at an angle in a range of 15 to 65 degrees in the first direction to the tire's circumferential direction and the plurality of reinforcements of the third reinforcement layer oriented at an angle in a range of 15 to 65 degrees in the second direction to the tire's circumferential direction.

The non-pneumatic tire may have a plurality of reinforcements of the second reinforcement layer oriented at an angle in a range of 40 to 50 degrees in the first direction to the tire's circumferential direction and the plurality of reinforcements of the third reinforcement layer oriented at an angle in a range of 40 to 50 degrees in the second direction to the tire's circumferential direction.

The non-pneumatic tire may have the plurality reinforcement of the second reinforcement layer oriented at about 45 degrees in the first direction to the tire's circumferential direction and the plurality reinforcement of the third reinforcement layer oriented at an angle in a range of about 45 degrees in the second direction to the tire's circumferential direction.

The non-pneumatic tire may further comprise of: a fifth reinforcement layer, located radially outward from the fourth reinforcement layer, comprised of at least one reinforcement oriented in the tire's circumferential direction; a sixth reinforcement layer, located radially inward from the first reinforcement layer, comprised of at least one reinforcement oriented in the tire's circumferential direction; and a seventh reinforcement layer, located radially outward from the fifth reinforcement layer, comprised of at least one reinforcement oriented in the tire's circumferential direction.

The non-pneumatic tire's reinforcements may be comprised of fiber reinforced plastic. The non-pneumatic tire's reinforcements may be comprised of glass fiber reinforced plastic.

The non-pneumatic tire's reinforcements may be embedded in an elastomeric material. The non-pneumatic tire's elastomeric material may be rubber. The non-pneumatic tire's elastomeric material may be polyurethane. The reinforcements may be embedded in another material, then embedded in rubber.

The non-pneumatic tire's plurality of connecting elements may be spokes.

The non-pneumatic tire's spokes may be comprised of rubber. The spokes may be comprised of fiber reinforced plastic embedded in rubber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
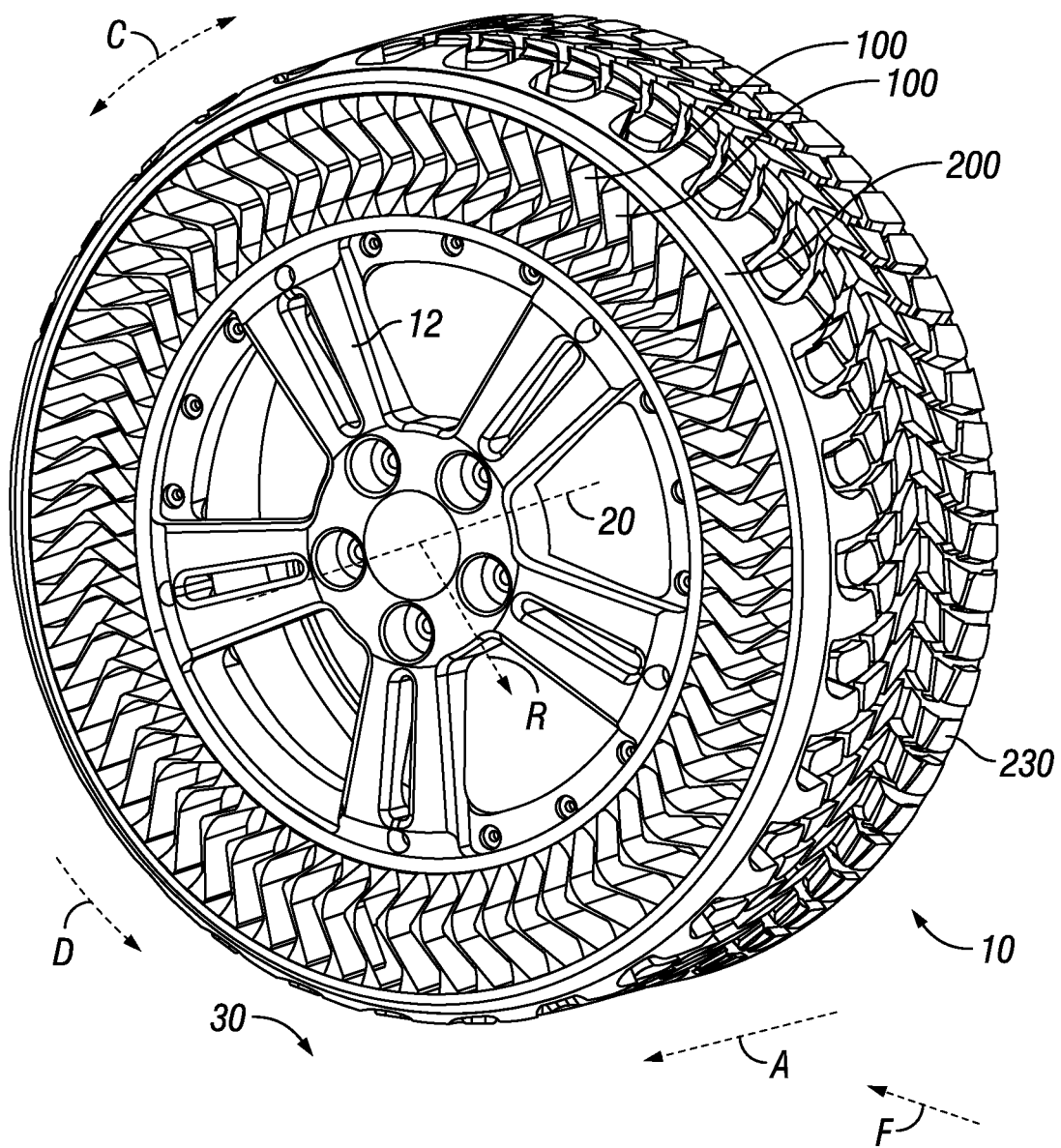
FIG. 1 provides a perspective view of an exemplary embodiment of the present invention as configured for use as a vehicle wheel.

The present invention provides a mechanical structure for resiliently supporting a load. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of for example, the shear band, tire, and/or wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the outer tread band and/or wheel structure.

"Circumferential direction" or the letter "C" in the figures refers to a direction is orthogonal to the axial direction and orthogonal to a radial direction.

"Forward direction of travel" or the letter "F" in the figures refers to the direction the tire was designed to predominantly travel in for aesthetics and or performance reasons. Travel in a direction different than the forward direction of travel is possible and anticipated.

"Direction of rotation" or the letter "D" in the figures refers to the direction the tire was designed to predominantly rotate in for aesthetics and/or performance reasons. Rotation in a direction opposite than the direction of rotation is possible and anticipated.

"Radial plane" means a plane that passes perpendicular to the equatorial plane and through the axis of rotation of the wheel.

"Lateral direction" or the letter "L" means a direction that is orthogonal to an equatorial plane.

"Tread band" as used herein refers to the radially outermost deflectable band of a tire comprising a radially outermost surface and a layer of reinforcements embedded in an elastic material. Generally the radially outermost surface would possess a plurality of grooves forming a tread pattern around the circumference of the tread band for engaging the ground surface such as a road.

"Elastic material" or "Elastomer" as used herein refers to a polymer exhibiting rubber-like elasticity, such as a material comprising rubber.

"Deflectable" means able to be bent resiliently.

"Nominal load" or "desired design load" is a load for which the wheel or tire is designed to carry and operate under. The nominal load or desired design load includes loads up to and including the maximum load specified by the manufacturer and, in the case of a vehicle tire, often indicated by marking on the side of a the tire. A loading condition in excess of the nominal load may be sustained by the tire, but with the possibility of structural damage, accelerated wear, or reduced performance.

"Modulus" or "Modulus of elongation" (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

"About" "Generally" or "Approximately" is a term used herein to mean "reasonably close to." It is understood by a person of ordinary skill in the art that such terms accommodate standard manufacturing tolerances.

FIG. 1 shows an exemplary embodiment showing a plurality of connecting elements, shown here as spokes 100, attached to an outer tread band 200 and forming a part of a tire 10. The tire 10 may be incorporated into a wheel by attachment to a hub 12. For example the tire 10 may be part of non-pneumatic wheel attached to a passenger vehicle allowing the vehicle to roll across a ground surface. Other objects and vehicles may incorporate the invention, including but not limited to: heavy duty truck, trailer, light truck, off-road, ATV, bus, aircraft, agricultural, mining, bicycle, motorcycle and passenger vehicle tires. Such a non-pneumatic wheel would possess a hub 12 that would have a radially outer surface having an axis of revolution about a central axis 20. The tire 10 may be attached to the hub 12 by any of a number of methods, for example, by mechanical fasteners such as bolts, screws, clamps or slots, and/or by adhesives such as cyanoacrylates, polyurethane adhesives, and/or by other bonding materials or a combination thereof.

The tire 10 shown here possesses an axis of rotation 20 about which the tire 10 rotates. In this exemplary embodiment, the radially outer surface 230 of the outer tread band 200 interfaces with a ground surface 30 over which the tire rolls. Under a nominal load, the spokes 100 of the tire flex as the tire enter and exit the contact patch. Smaller deflections occur in the spokes 100 as the spoke rotates about the axis 20 outside the contact patch, but the majority of the deflection occurs while the spoke 100 enters, exits and travels through the contact patch.

In the exemplary embodiment shown, the tread band 200 comprises an elastomeric material and allows deformation to form a planar footprint in the contact patch. In the present invention the outer tread band 200 possesses a plurality of reinforcements 251 to help carry the load circumferentially around the tire. For this particular embodiment, the size of the tire 100 is equivalent to a pneumatic tire having a size of 205/55R16 with the lateral width of the tread being about 165 mm.

Figure 2:
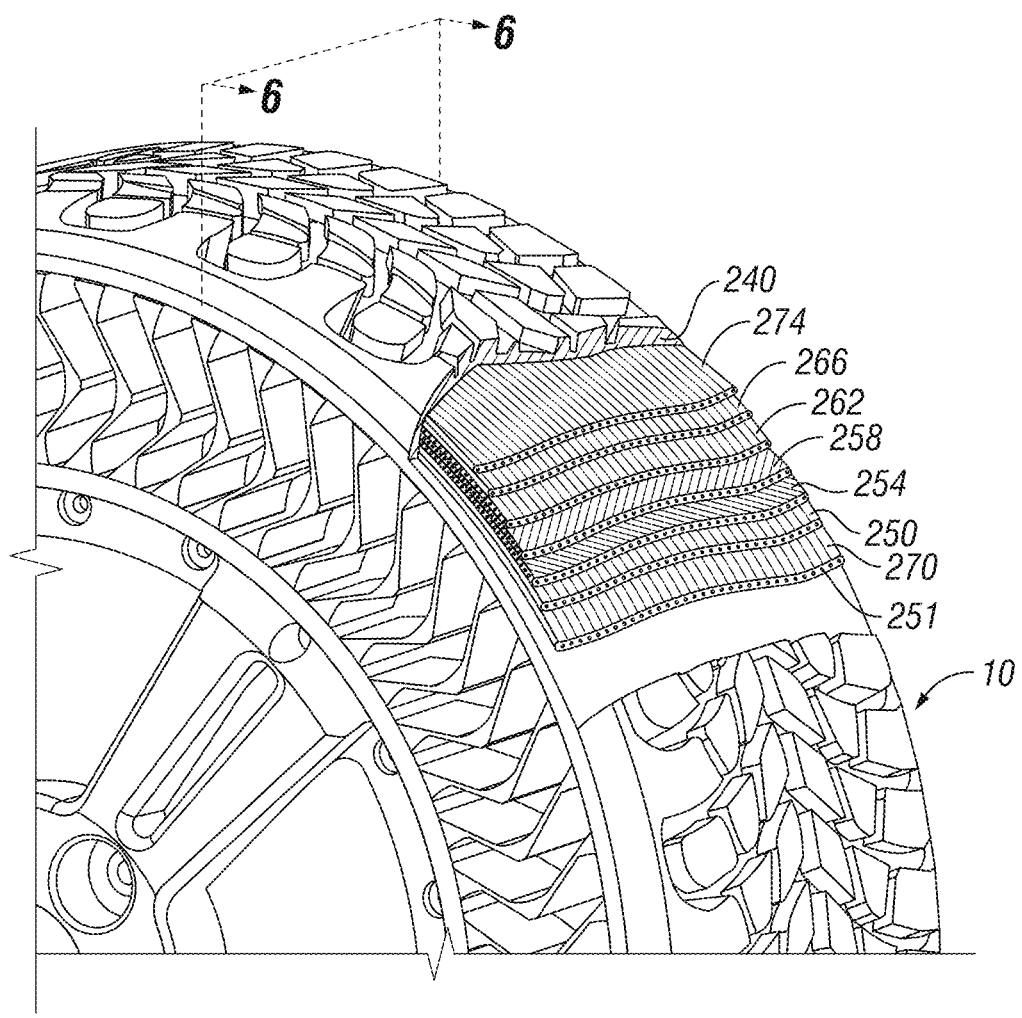
FIG. 2 provides a partial perspective cutaway view of an exemplary embodiment of the present invention.

FIG. 2 shows a partial perspective section view of an exemplary embodiment of the present invention. A plurality of reinforcements 251 are embedded in an elastomeric material 240 and are depicted here as forming seven distinct membrane layers. It is understood that during formation of the tire that shifting of the reinforcements may occur as the band is heated and pressed and some interlacing of the reinforcements may occur, causing the layers of reinforcement to be less defined.

Shown here is a first reinforcement layer 250 comprised of reinforcement 251 wound about the circumference of the tire 10. In this exemplary embodiment, the layer is wound circumferentially about the tire 10 allowing an individual reinforcement 251 to lie at almost 0 degrees from the equatorial plane of the tire. This orientation is considered to be oriented in the tire's circumferential direction. Multiple individual reinforcements 251 may be laid down at the same time which would result in a slightly larger angle to the equatorial plane, but generally less than 1 degree. For example, where six reinforcements are laid down together like a piece of tape or ribbon, the angle to the equatorial plane would be slightly greater, but still considered in the tire's circumferential direction. In some instances manufacturing variation and/or machine tolerances may result in angles as great as 5 degree, but for the purposes contained herein, are still considered to be oriented in the tire's circumferential direction. The reinforcements in the embodiment shown are comprised of glass fiber reinforced plastic. They may be laid down already embedded in a coating of elastomeric material, or rubber as shown in the present embodiment. Alternatively, where multiple reinforcements are laid down at the same time, say six reinforcements at once, they may be laid down as a ribbon already embedded in a coating of rubber. Alternatively, the reinforcement may be laid down without being embedded in rubber, then a layer of rubber may be applied over the reinforcement.

For this embodiment, a pace of 1.7 mm for each reinforcement layer, with a rubber thickness of 0.5 mm between adjacent reinforcements and a rubber modulus of 3.8 MPa. Alternatively the pace may fall within a range of 1 to 5 mm and possess a rubber thickness of 0.2 mm to 1 mm between adjacent reinforcements and have a rubber modulus of 1 MPa to 40 MPa as measured at MA10 described above. The reinforcement diameter may be between 0.2 mm and 2 mm.

A second reinforcement layer 254 is laid down radially outward from the first reinforcement layer 250. The second reinforcement is laid down such that each individual reinforcement is positioned at a relatively larger angle to the equatorial plane of the tire than the first layer. Here in the present embodiment, the angle formed between an individual reinforcement and the equatorial plane is 45 degrees. It should be understood that manufacturing variation and tolerances of the manufacturing process may inhibit exact orientation of 45 degrees and a variation of 2 or 3 percent should be anticipated. In some instances manufacturing variation and tolerances could cause deviations as great as 5 degrees.

Alternatively the individual reinforcements of reinforcement layer 254 may be laid down at an angle chosen from a range of 15 to 65 degrees. Angles deviating from 45 degrees would allow less lateral response of the tire, allowing the designer to "tune" the tire for the desired performance characteristics.

A third reinforcement layer 258 is laid down radially outward from the second reinforcement layer 254 at an angle opposite of the second reinforcement layer. In other words, what is meant by "an angle opposite" is that if one considers zero degrees to be the longitudinal direction of the tire along the tread band, a second layer is laid down with reinforcements oriented along a positive angle to the longitudinal direction and a third layer is laid down with reinforcements oriented along a negative angle to the longitudinal direction. Similar to the second reinforcement layer 254, the third reinforcement layer is laid down at a relatively larger angle to the equatorial plane of the tire than the first layer. Here in the present embodiment, the angle formed to the equatorial plane is 45 degrees. It should be understood that manufacturing variation and tolerances of the manufacturing process may inhibit exact orientation of 45 degrees and a variation of 2 or 3 percent should be anticipated. In some instances manufacturing variation and tolerances could cause deviations as great as 5 degrees.

Alternatively the third reinforcement layer 258 may be laid down at an angle chosen from a range of 15 to 65 degrees.

A fourth reinforcement layer 262 is laid down radially outward from the third reinforcement layer 258. The fourth reinforcement layer 262 is wound circumferentially about the tire 10 allowing the individual reinforcement to lie in the tire's circumferential direction similar to the first reinforcement layer 250.

A fifth reinforcement layer 266 is laid down radially outward from the fourth reinforcement layer 262. The fourth reinforcement layer 266 is wound circumferentially about the tire 10 allowing the individual reinforcement to lie in the tire's circumferential direction similar to the first reinforcement layer 250.

A sixth reinforcement layer 270 is laid down radially inward from the first reinforcement layer 250. The sixth reinforcement layer 270 is wound circumferentially about the tire 10 allowing the individual reinforcement to lie in the tire's circumferential direction similar to the first reinforcement layer250.

A seventh reinforcement layer 274 is laid down radially outward from the fifth reinforcement layer 266. The seventh reinforcement layer 274 is wound circumferentially about the tire 10 allowing the individual reinforcement to lie in the tire's circumferential direction similar to the first reinforcement layer 250.

The reinforcement layers having individual reinforcements lying in the tire's circumferential direction, such as the first, fourth, fifth, sixth and seventh reinforcement layers 250, 262, 266, 270, and 274 above, carry compressive and tensile forces and help transfer the load about the circumference of the tire. The reinforcement layers having individual reinforcement lying at an angle of 15 to 65 degrees to the circumferential direction of the tire, such as the second and third reinforcement layers 254, 258, help to improve the lateral response of the tire. It is thought this is achieved by increasing the in-plane shear stiffness compared to a non-pneumatic tire that lack these angled reinforcement layers. These angled layers improve handling behavior by improving steering response (i.e.: increasing the steering responsiveness of the tire) and increasing cornering stiffness of the tire. Along with increased cornering stiffness, the embodiments of the present invention improve front-to-rear lateral response balance improving the handling perception by the driver and improving the vehicle's traction control response.

The reinforcement layers having individual reinforcement lying at an angle of 15 to 65 degrees to the circumferential direction of the tire ("angled reinforcement layers") are located between layers which are oriented in the tire's circumferential direction. As the tire deflects in the contact patch, the innermost layer and outermost layer experience a greater percentage of the circumferential loading as they experience a greater percentage of compressive and tensile loads. Configuring the angled reinforcement layers of the tire between layers which are oriented in the tire's circumferential direction help reduce the overall thickness of the tread band while maintaining similar load bearing characteristics compared to other arrangements, such as having the reinforcement layers having the angled reinforcement layers located on the radially inner side and the reinforcement layers oriented in the tire's circumferential direction on the radially outer side. The angled reinforcement layer's reinforcement angle does not have to have the same magnitude, provided the angles are otherwise in opposite directions.

While this embodiment shows seven layers of reinforcement, other numbers of reinforcement layers is possible. By way of example, an alternative embodiment may have only a first reinforcement layer, a second reinforcement layer, a third reinforcement layer and a fourth reinforcement layer with each layer comprised as described above. In another alternative embodiment, the tread band may comprise of a first reinforcement layer, a second reinforcement layer, a third reinforcement layer, a fourth reinforcement layer and a fifth reinforcement layer with each layer comprised as described above. In yet another alternative embodiment, the tread band may comprise of a first reinforcement layer, a second reinforcement layer, a third reinforcement layer, a fourth reinforcement layer, a fifth reinforcement layer and a sixth reinforcement layer with each layer comprised as described above.

Figure 3:
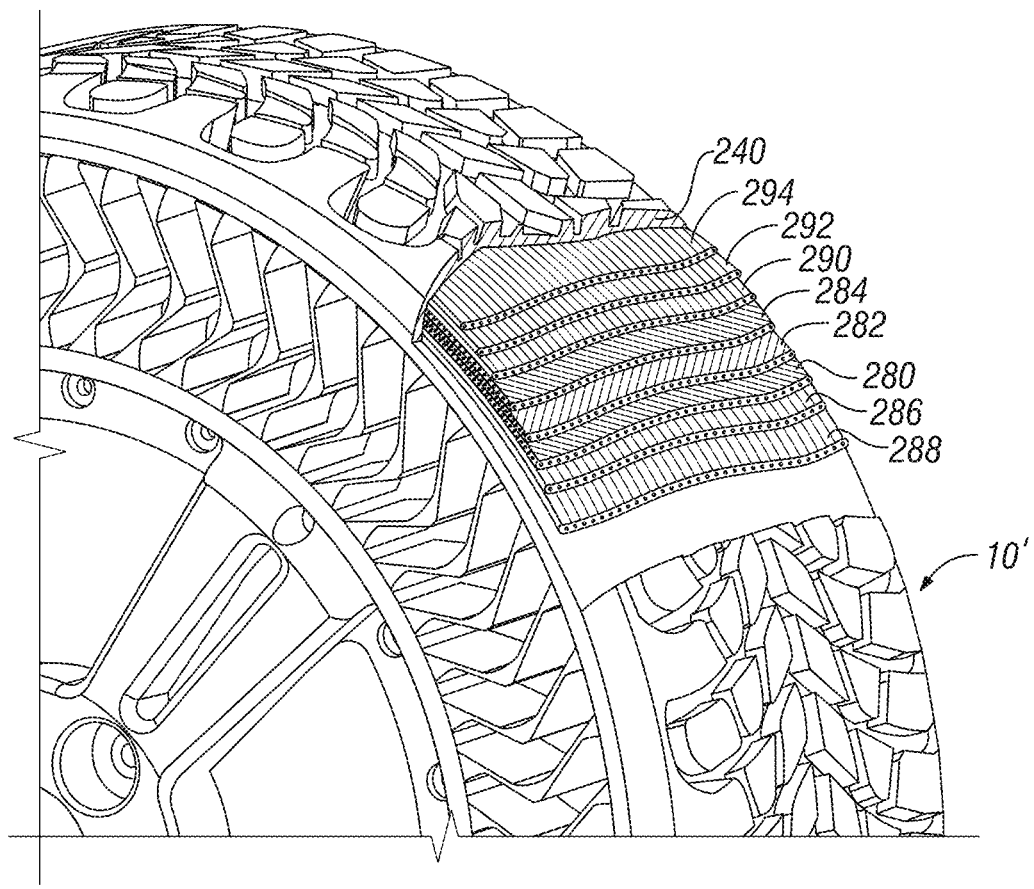
FIG. 3 provides a partial perspective cutaway view of another exemplary embodiment of the present invention.

FIG. 3 provides a cutaway sectional view of yet another embodiment of a tire 10' having an odd number of angled reinforcement layers. In this embodiment there are three angled reinforcement layers 280, 282, 284. Two reinforcement layers, 286 and 288, oriented in the tire's circumferential direction are located on the radially inner side of the three angled reinforcement layers 280, 282, 284. Three more reinforcement layers 290, 292, 294 are located on the radially outer side of the three angled reinforcement layers 280, 282, 284. The odd number of angled reinforcement layers allows the tire designer to minimize ply steer that might be otherwise generated by an even number of angled reinforcement layers. The angles that the reinforcements make do not have to be of the same magnitude, but may be different magnitudes. At least one of the angled reinforcement layers, however, should have an angle opposite of two other reinforcements.

Figure 4:
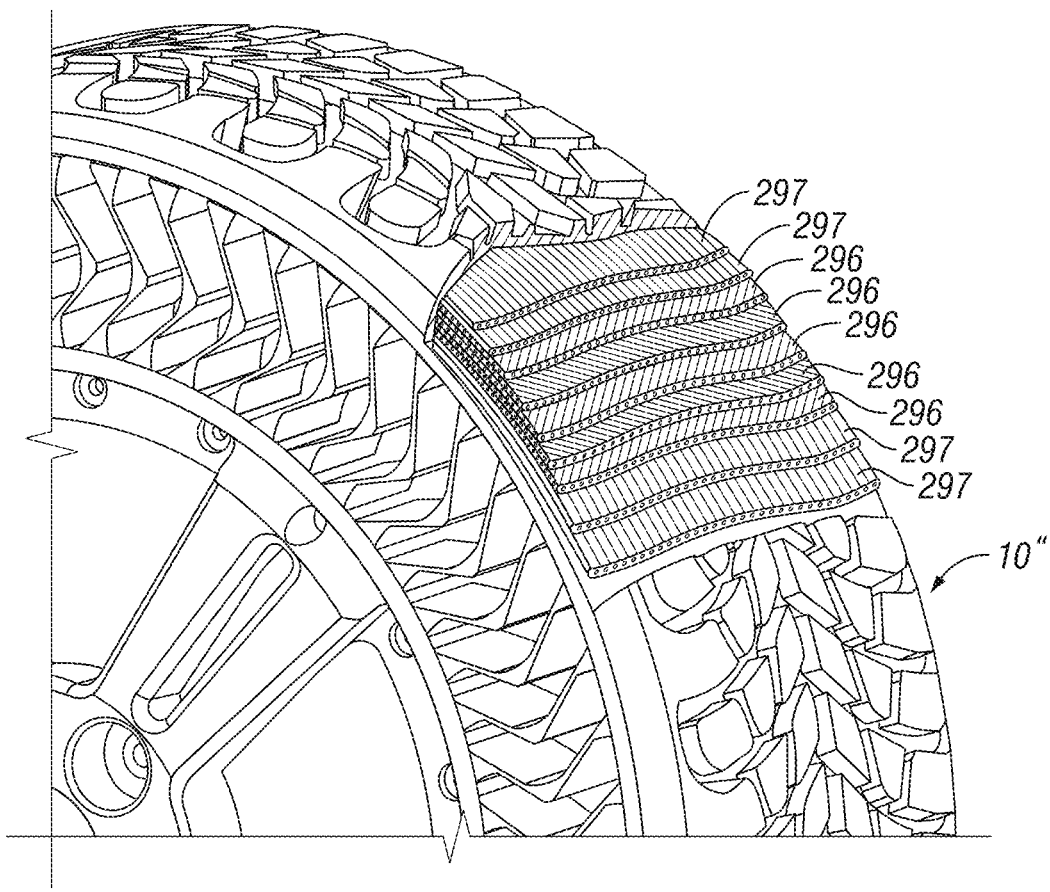
FIG. 4 provides a partial perspective cutaway view of yet another exemplary embodiment of the present invention.

Alternative embodiments may include having four or more angled reinforcement layers. In one alternative embodiment of a tire 10", shown in FIG. 4, five angled reinforcement layers 296, two reinforcement layers 297 oriented in the tire's circumferential direction located radially inside the angled reinforcement layers 296 and two reinforcement layers 297 oriented in the tires circumferential direction located radially outside the angled reinforcement layers 296.

Should there be an odd number of reinforcement layers having reinforcements angled in the tire's circumferential direction, it is preferable to have the higher number of reinforcements radially outside the angle reinforcement layers.

Figure 5:
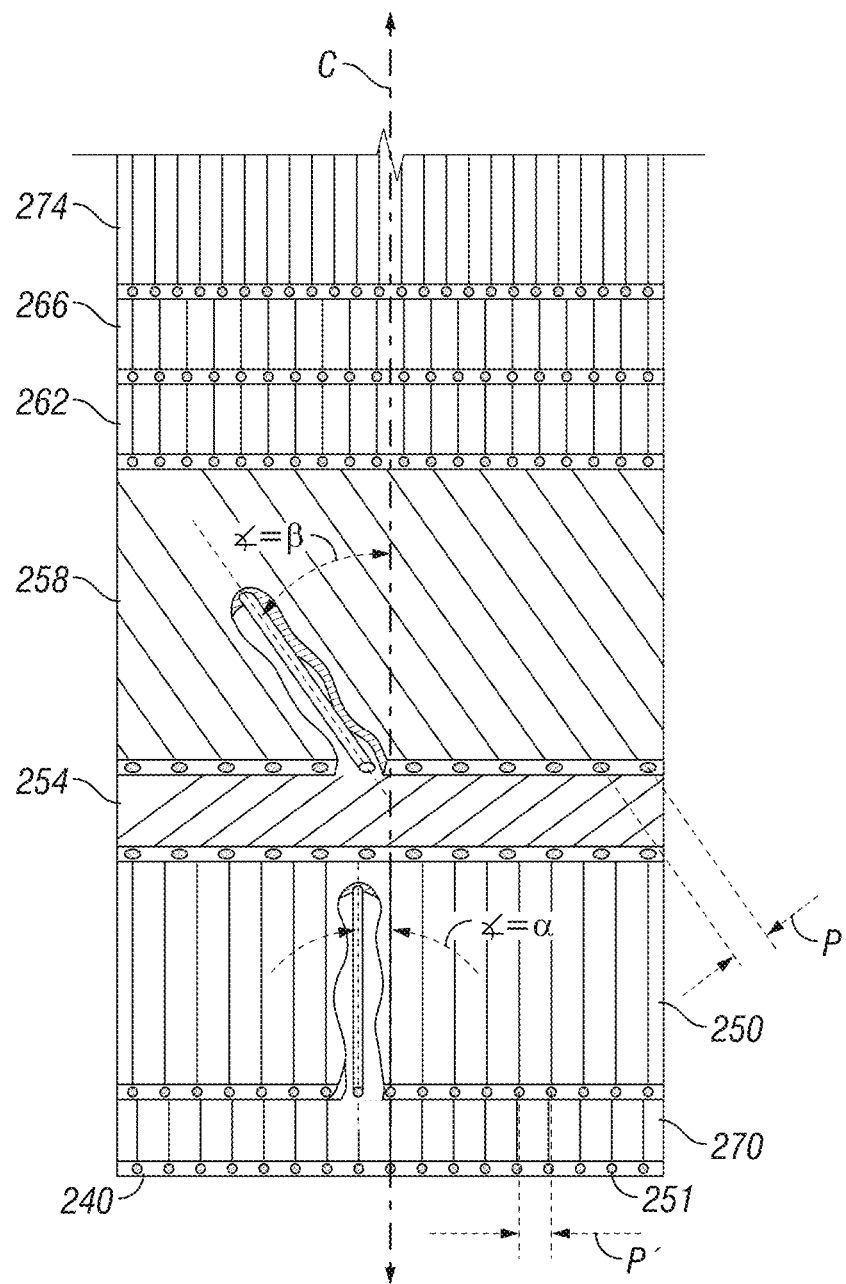
FIG. 5 provides a schematic cutaway view looking down upon layers of tread band reinforcements of the present invention.

FIG. 5 is a schematic overhead section view of a plurality of layers of the embodiment shown in FIG. 2. The individual reinforcements 251 of the reinforcement layers oriented along the tire's circumferential direction "C", are embedded in an elastomeric material 240 and are spaced apart at a pace P' measured in a direction perpendicular to the reinforcement's orientation. As stated above, a small angle alpha, may be present, resulting in an angle magnitude as great as 5 degrees deviation from 0 degrees. In the angled reinforcement layer the individual reinforcement 251 are spaced apart at a pace P measured in a direction perpendicular to the reinforcement's orientation. The angle, beta, is the angle that the reinforcement makes to the tire's circumferential direction C is measured along the length of the reinforcement. It is understood that such values specified herein may not be exact due to manufacturing tolerance or other such limitations of manufacturing. Pacing is measured from the center of each reinforcement.

Figure 6:
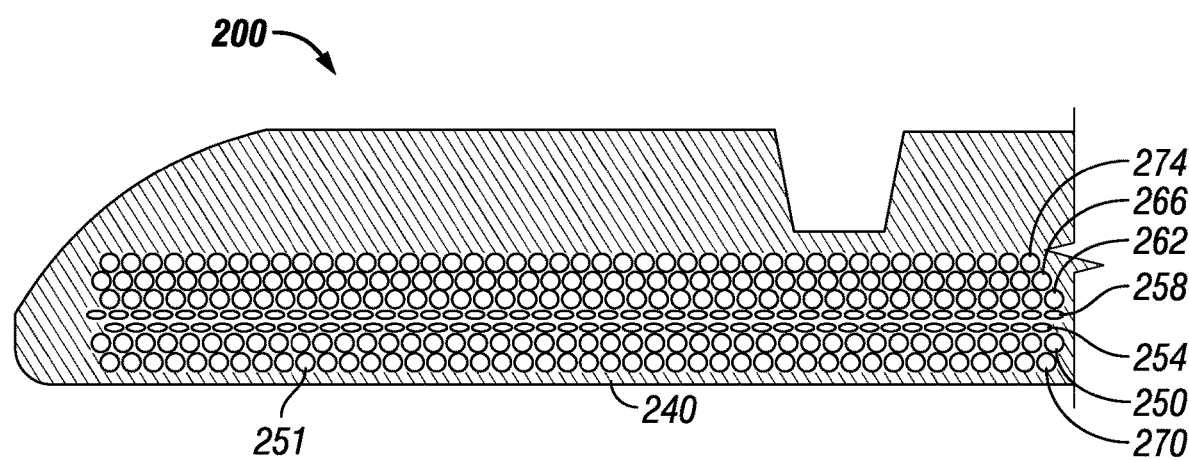
FIG. 6 provides a partial section view of the tread band taken at section 6-6 in FIG. 2.

FIG. 6 shows a partial cross section view of the reinforcements 251 embedded the tread band 200 of the tire of the first embodiment. The cross section is taken on line 6-6 of FIG. 2. It is anticipated that interlacing of the reinforcements 251 may occur as the reinforcements are layered causing some overlap of adjacent layers. Such interlacing is likely limited, however, to where the adjacent layers are oriented in the same direction, such as in layers 270 and 250, or in layers 262, 266, and 274.

In the embodiments disclosed herein, each embodiment lacks a distinct rubber shear layer between the reinforcement layers. In other words, the radially adjacent reinforcements of each of the radially adjacent reinforcement layers are separated in the radial direction a uniform distance from one another. This "uniform distance" may vary due to variations encountered during the building of the wheel, but within +/−2.9 mm. Alternatively this "uniform distance" is within +/−1.5 mm. In yet another alternative, this "uniform distance" is within +/−1 mm. For example, the radial distance between a first pair of radially adjacent layers may be measured as 0.1 mm at one location and the radial distance between a second pair of radially adjacent layers may be measured as 2.8 mm at another location and be considered a "uniform distance" to one another. While a small amount of rubber still allows shear to occur between the radially adjacent reinforcement layers, the reinforcement layers are uniformly distributed in the radial direction within the outer band. A lack of reinforcement-free sheet-like "shear layer" between reinforcement layers reduces weight of the outer band, improves rolling resistance and does not detract adversely from the durability of the tread ring.

In at least one embodiment, the radial distance between reinforcements of adjacent reinforcement layers is less than 3 mm.

It should be understood that other connecting elements other than spokes, other configurations and geometries may be used within the scope of the invention, including web elements which are interconnected such as where they may form a honeycomb or other configuration.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" Also, the dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" refers to one or more steps that may be performed in other ordering than shown without departing from the scope of the presently disclosed invention. As used herein, the term "method" or "process" may include one or more steps performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

The terms "a," "an," and the singular forms of words shall be taken to include the plural form of the same words, such that the terms mean that one or more of something is provided. The terms "at least one" and "one or more" are used interchangeably. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A non-pneumatic tire having a central axis and an equatorial plane perpendicular to said central axis, said non-pneumatic tire attached to a hub, said non-pneumatic tire comprising:
   a tread band;
   a plurality of spokes connecting said tread band to said hub;
   wherein said tread band further comprises:
   a ground engaging surface;
   a first reinforcement layer comprised of at least one reinforcement oriented in the tire's circumferential direction;
   a second reinforcement layer, located radially outward from said first reinforcement layer, said second reinforcement layer comprised of a plurality of reinforcements oriented at an angle in a first direction to said tire's circumferential direction;
   a third reinforcement layer, located radially outward from said second reinforcement layer, said third reinforcement layer comprised of a plurality of reinforcements oriented at an angle in a second direction to said tire's circumferential direction;
   a fourth reinforcement layer, located radially outward from said third reinforcement layer, comprised of at least one reinforcement oriented in the tire's circumferential direction;
   wherein the radially adjacent reinforcement layers are separated in the radial direction a uniform distance from one another;
   wherein said plurality of spokes are comprised of fiber reinforced plastic embedded in rubber.

2. The non-pneumatic tire of claim 1 wherein the at least one reinforcement of said first reinforcement layer is oriented at an angle to the equatorial plane of the tire in a range of 0 to 5 degrees and the at least one reinforcement of said fourth reinforcement layer is oriented at an angle to the equatorial plane of the tire in a range of 0 to 5 degrees.

3. The non-pneumatic tire of claim 2 wherein the plurality of reinforcements of said second reinforcement layer is oriented at an angle in a range of 40 to 50 degrees in said first direction to said tire's circumferential direction and the plurality of reinforcements of said third reinforcement layer is oriented at an angle in a range of 40 to 50 degrees in said second direction to said tire's circumferential direction.

4. The non-pneumatic tire of claim 3 wherein said non-pneumatic tire further comprises:
   a fifth reinforcement layer, located radially outward from said fourth reinforcement layer, comprised of at least one reinforcement oriented in the tire's circumferential direction;
   a sixth reinforcement layer, located radially inward from said first reinforcement layer, comprised of at least one reinforcement oriented in the tire's circumferential direction; and
   a seventh reinforcement layer, located radially outward from said fifth reinforcement layer, comprised of at least one reinforcement oriented in the tire's circumferential direction.

5. The non-pneumatic tire of claim 4 wherein said reinforcements are comprised of fiber reinforced plastic.

6. The non-pneumatic tire of claim 5 wherein said reinforcements are embedded in an elastomeric material.

7. The non-pneumatic tire of claim 6 wherein each of the reinforcement layers are radially adjacent to at least one other of the reinforcement layers and the radial distance between the radially adjacent reinforcement layers is less than 3 mm.

8. The non-pneumatic tire of claim 1 wherein the at least one reinforcement of said first reinforcement layer is oriented at an angle to the equatorial plane of the tire in a range of 0 to 1 degrees and the at least one reinforcement of said fourth reinforcement layer is oriented at an angle to the equatorial plane of the tire in a range of 0 to 1 degrees.

9. The non-pneumatic tire of claim 1 wherein the at least one reinforcement of said first reinforcement layer is oriented at an angle to the equatorial plane of the tire in a range of 0 to 0.2 degrees and the at least one reinforcement of said fourth reinforcement layer is oriented at an angle to the equatorial plane of the tire in a range of 0 to 0.2 degrees.

10. The non-pneumatic tire of claim 1 wherein the plurality of reinforcements of said second reinforcement layer is oriented at an angle in a range of 15 to 65 degrees in said first direction to said tire's circumferential direction and the plurality of reinforcements of said third reinforcement layer is oriented at an angle in a range of 15 to 65 degrees in said second direction to said tire's circumferential direction.

11. The non-pneumatic tire of claim 1 wherein the plurality of reinforcements of said second reinforcement layer is oriented at an angle in a range of 40 to 50 degrees in said first direction to said tire's circumferential direction and the plurality of reinforcements of said third reinforcement layer is oriented at an angle in a range of 40 to 50 degrees in said second direction to said tire's circumferential direction.

12. The non-pneumatic tire of claim 1 wherein the plurality of reinforcements of said second reinforcement layer is oriented at about 45 degrees in said first direction to said tire's circumferential direction and the plurality of reinforcements of said third reinforcement layer is oriented at an angle in a range of about 45 degrees in said second direction to said tire's circumferential direction.

13. The non-pneumatic tire of claim 1 wherein said non-pneumatic tire further comprises:
   a fifth reinforcement layer, located radially outward from said fourth reinforcement layer, comprised of at least one reinforcement oriented in the tire's circumferential direction;

a sixth reinforcement layer, located radially inward from said first reinforcement layer, comprised of at least one reinforcement oriented in the tire's circumferential direction; and a seventh reinforcement layer, located radially outward from said fifth reinforcement layer, comprised of at least one reinforcement oriented in the tire's circumferential direction.

14. The non-pneumatic tire of claim 1 wherein said reinforcements are comprised of fiber reinforced plastic.

15. The non-pneumatic tire of claim 1 wherein said reinforcements are embedded in an elastomeric material.

16. The non-pneumatic tire of claim 15 wherein said elastomeric material is rubber.

17. The non-pneumatic tire of claim 1 wherein each of the reinforcement layers are radially adjacent to at least one other of the reinforcement layers and the radial distance between the radially adjacent reinforcement layers is less than 3 mm.

* * * * *